United States Patent [19]

Limburg et al.

[11] 3,915,704

[45] Oct. 28, 1975

[54] PHOTOINDUCED, ACID CATALYZED DEGRADATION OF DEGRADABLE POLYMERS

[75] Inventors: William W. Limburg, Penfield; Milan Stolka, Fairport, both of N.Y.

[73] Assignee: Xerox Corporation, Stamford, Conn.

[22] Filed: Nov. 1, 1973

[21] Appl. No.: 411,602

[52] U.S. Cl. .................. 96/27 R; 96/35.1; 96/48 R; 96/49; 96/115 R; 204/159.21; 260/67 R; 260/899; 96/35

[51] Int. Cl.$^2$... G03C 5/04; G03C 5/00; G03C 1/68

[58] Field of Search ........... 260/67 R, 899; 96/27 R, 96/115 R, 35.1; 204/159.21

[56] References Cited

UNITED STATES PATENTS

| | | | |
|---|---|---|---|
| 2,892,712 | 6/1959 | Plambeck, Jr. | 96/36.3 |
| 3,313,753 | 4/1967 | Roberts et al. | 260/899 |
| 3,558,311 | 1/1971 | Delzenne et al. | 96/36.3 |
| 3,779,778 | 12/1973 | Smith et al. | 96/115 R |

*Primary Examiner*—Roland E. Martin, Jr.
*Assistant Examiner*—J. P. Brammer
*Attorney, Agent, or Firm*—James J. Ralabate; James P. O'Sullivan; John H. Faro

[57] ABSTRACT

An imaging method based upon the ultraviolet light induced acid catalyzed degradation of a composition comprising at least one acid degradable polymer of the formula:

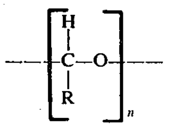

wherein

R is an aliphatic hydrocarbon radical of 1 – 6 carbon atoms, a chlorinated aliphatic hydrocarbon radical of 1 – 6 carbon atoms, or a nitrile substituted aliphatic hydrocarbon radical of 1 – 5 carbon atoms; and

*n* is the degree of polymerization.

In the above imaging method one or more of the above degradable polymers is formulated with (1) a polymer capable of undergoing photoinduced dehydrohalogenation, and (2) an electron acceptor. Upon irradiation of the film containing such materials, an acid produced as a result of dehydrohalogenation attacks the degradable polymer thus causing its degradation. The effects of this degradation in the exposed regions of the film are generally visually discernable thus a permanent image is generated without further development or fixing being required.

28 Claims, 3 Drawing Figures

PHOTOINDUCED, ACID CATALYZED DEGRADATION OF DEGRADABLE POLYMERS

BACKGROUND OF THE INVENTION

1. Field of the Invention

This invention relates to a composition, an imaging method, and an article useful in said method. More specifically, this invention involves a method for photoinduced, acid catalyzed degradation of certain degradable polymers. Such degradation may be performed selectively and thus this system is useful in the formation of permanent visible images within films containing the degradable polymer and the other ingredients essential for in situ formation of the acid required to effect such degradation. The image so generated may take the form of raised and depressed regions within the imaging layer and thus a film so imaged may be used as a relief printing master.

2. Description of the Prior Art

The use of photodegradable polymers in the preparation of relief images is well known, see, for example, U.S. Pat. Nos. 3,558,311; and 2,892,712 (Examples 7 and 9). In such processes, the selective illumination of an imaging layer containing such polymers results in degradation of the photodegradable polymer into lower molecular weight materials. The products of such degradation differ from the nondegraded polymer and therefore provide a basis for image formation. In the U.S. Pat. No. 3,558,311, the selective illumination of a polymer containing an oxime ester results in selective degradation of the polymer in the exposed regions of a film containing said polymer. The image is developed by removal of the degraded materials from the imaging layer with solvents which are specific for the degradation products but unreactive toward the unexposed regions of the imaging layer. The U.S. Pat. No. 2,892,712 is similar in its disclosure, however, subsequent to imaging of the films of an unstabilized formaldehyde polymer, the image is developed thermally. In both these disclosures, the intensity and duration of exposure required to produce photolytic degradation within such films is quite extensive. Moreover, even after such extensive exposure, the image is still not visible, but requires development either with solvents or by thermal treatment. These systems are, thus, inefficient, expensive and impractical for use commercially.

Accordingly, it is the object of this invention to provide a method for rapid and efficient degradation of selected polymers.

It is a further object of this invention to adapt said method for use in an imaging system.

It is another object of this invention or provide a high gain imaging system based upon the rapid and efficient acid catalyzed degradation of selected polymers within an imaging layer.

It is a further object of this invention to provide a high gain imaging system wherein selective acid catalyzed degradation of specific polymers is initiated with ultraviolet light.

Still yet another object of this invention is to provide an imaging member useful in the above imaging method.

SUMMARY OF THE INVENTION

The above and related objects are achieved by providing a method for the selective degradation of a composition comprising at least one acid degradable polymer of the formula:

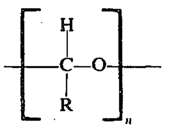

wherein

R is an aliphatic hydrocarbon radical of 1 – 6 carbon atoms, a chlorinated aliphatic hydrocarbon radical of 1 – 6 carbon atoms, or a nitrile substituted aliphatic hydrocarbon radical of 1 – 5 carbon atoms; and $n$ is at least 50.

In this method, a thin film of a composition comprising at least one degradable polymer of the above formula, at least one polymer capable of undergoing photoinduced dehydrohalogenation (hereinafter referred to as "acid generating polymer") and an organic electron acceptor are subjected to selective illumination with ultraviolet light for a brief interval whereupon a visible image is formed within the thin film. The relative weight ratio of acid degradable polymer to acid generating polymer in the film can range from about 99:1 to about 1:99 and preferably from about 75:25 to about 50:50. The concentration of electron acceptor will generally range from about 0.1 – 5 weight percent based upon acid generating polymer concentration. In the preferred embodiments of this invention, the acid degradable polymer is poly(acetaldehyde); and the acid generating polymer is poly(vinylbromide). It is also preferable that such films be illuminated with ultraviolet light at a wavelength of less than about 3000 Å.

During dehydrohalogenation, it is postulated that the acid generating polymer undergoes homolytic cleavage of the carbon-halogen bond forming a polymer free radical and a halogen free radical. These free radicals can recombine unless their potential reunion is inhibited. Where such dehydrohalogenation is carried out in the presence of an organic electron acceptor, substantial recombination of these free radicals is apparently precluded, thus, favoring formation of an unsaturated linkage along the polymer backbone and a mineral acid. This type of inhibition of recombination of these free radicals insures the formation of a mineral acid within the imaging layer thus producing a high quantum gain imaging system requiring only brief irradiation with ultraviolet light to produce highly visible permanent changes in the acid degradable polymers contained within the exposed regions of the film.

DESCRIPTION OF THE INVENTION INCLUDING PREFERRED EMBODIMENTS

Figure 1:
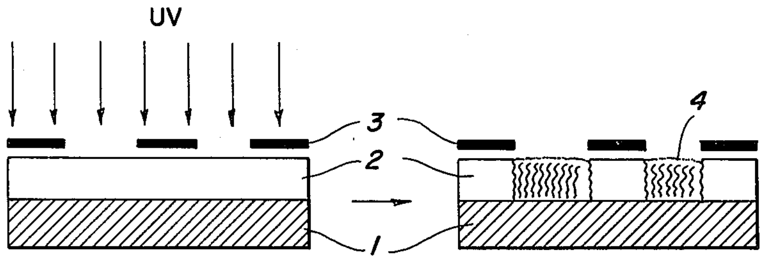
FIG. 1 is an elevational view in vertical cross-section through an imaging member wherein the exposed areas of its imaging layer become soft and tacky subsequent to irradiation with ultraviolet light.

According to the method of the invention, a composition consisting essentially of an acid degradable polymer, an acid generating polymer and an organic electron acceptor is formed into a substantially uniform film. The technique used in fabrication of this uniform film is incidental to the methods and articles of this invention. For example, the various components of the film can be dissolved in tetrahydrofuran and then the resulting solution sprayed, draw or dip coated on a separate substrate, or formed independent of such substrate into self-supporting films by solvent casting techniques. Where such films, either because of their relative thickness or because of their ultimate use, are to be associated with a substrate, it is generally advisable to form the film directly on the substrate.

The composition of this film, as indicated previously, can comprise one or more acid degradable polymers having the hereinbefore described structural formula. Representative of such acid degradable polymers are poly(acetaldehyde), poly(propionaldehyde), poly(-butyraldehyde), poly(valeraldehyde), poly(heptaldehyde), and the halogen and cyano substituted derivatives thereof (e.g. polychloracetaldehyde and poly(-beta-cyanoprionaldehyde). These degradable polymers comprise the major active component of such films irrespective of whether such polymers are copolymerized with or dispersed throughout other polymeric materials; occur as block segments in combination with structural units from other thermoplastic polymers; or occur as side chains appended from the backbone of another thermoplastic polymer. These other thermoplastic polymers used in association with the acid degradable polymers can also undergo acid degradation or be relatively inert to acid attack.

The acid generating polymer of the composition can be any one or combination of the polyvinylhalides or polyvinylidene halides containing units corresponding to the following formula:

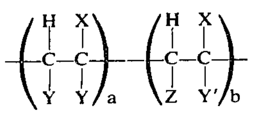

wherein

- X is selected from among chlorine, bromine or iodine;
- Y and Y' are independently selected from X or hydrogen;
- Z is selected from among Y, alkyl of about 1 – 8 carbon atoms, phenyl or alkyl substituted phenyl, said alkyl substituted having from about 1 to 8 carbon atoms; and
- *a* and *b* represent the mole percent of each of the components within the acid generating polymer and have an aggregate value equal to 100 percent.

Typical of such acid generating polymers include poly(vinylchloride) poly(vinylbromide), poly(vinyliodide), poly(vinylidenechloride), poly(vinylidenebromide) copolymers and mixtures thereof. Poly(vinyliodide) can be prepared by substitution of iodine substituents on a polyolefin in the event that difficulty is encountered in polymerization of vinyliodide monomer. Although polyvinylfluoride can also conceivably be used in the hereinbefore described composition, dehydrohalogenation of this material requires more intense irradiation with ultraviolet light than do the other vinyl or vinylidene halides and is thus less preferred. In the preferred embodiments of this invention, the acid generating polymer is a linear polymer and the relative molecular weights of this polymer and the acid degradable polymer are matched so as to insure the phase compatability of such materials for high gain imaging systems employing such materials. Irrespective of the acid generating polymer selected for use in this composition, it must be of sufficient molecular weight to distinguish it from the products generated during depolymerization of the acid degradable polymer. In addition, its solvent affinity and degree of solubility should closely approximate that of the degradable polymer's prior to selective depolymerization of the degradable polymer.

The electron acceptor selected for use in this composition can be any of the materials commonly used in association with photoconductive materials, e.g. Lewis Acids. Typical of such materials are tetracyanoethylene, bromanil, chloranil, cyananil, dicyanodichlorobenzoquinone, tetracyanoquinodimethan and 2,4,7-trinitro-9-fluorenone. Since these acceptors are only present in the composition in trace amounts, they do not present any serious problems with regard to their compatibility with the other ingredients of the composition.

In addition to the three essential materials specifically described above, the composition used in the imaging method of this invention can also contain one or more thermoplastic resins. Thermoplastic resins which are suitable for use in these compositions may or may not be compatible with one or more of the three essential ingredients also contained therein. The thermoplastic resins useful in this composition should preferably be substantially nonabsorbing of the activating electromagnetic radiation needed for inducing dehydrohalogenation of the acid generating polymer. Typical of such resins are the poly(acrylates), poly(methacrylates), and poly(styrene).

Where the thermoplastic resin used in this composition is substantially incompatible with all of the three essential ingredients of the composition, the addition of such essential ingredients to the thermoplastic resin can result in the formation of finely dispersed microdomains of essential ingredients throughout this thermoplastic matrix. This type of composition is especially preferred since the isolation of the essential material within certain confined regions inhibits the acid generated during dehydrohalogenation from migration from the illuminated areas of the composition to the nonilluminated areas of the composition, thus, insuring better image resolution.

Other optional ingredients can also be added to the composition, including substances which themselves are capable of reacting or combining in such a manner so as to generate a visually discernable change within the bulk of the imaging layer. Ordinarily, pairs of such materials will be segregated so as not to react or combine prior to irradiation of the composition with ultraviolet light. This segregation of ingredients is achieved through lamination or by encapsulation of only one such ingredient within the degradable polymer.

Upon the formulation of the composition from the appropriate ingredients in their proper relative proportions, such composition can be formed into a film having a thickness in the range of from about 0.1 to about 300 microns. The film can then be imaged with ultraviolet light at an intensity and for an interval sufficient to cause visually discernable differences between the exposed and nonexposed regions of the film. For example, a composition comprising predominantly poly(acetaldehyde) and minor amounts of polyvinylbromide with traces of tetracyanoethylene can be formed from a tetrahydrofuran solution on a glass substrate such that its dry film thickness will be within the above range. It is advisable that the formulation of such materials be carried out under conditions which insure shielding of the composition from sunlight or other sources of ultraviolet light both during and subsequent to its preparation. Once such a film has been prepared, it can be selectively irradiated in imagewise configuration with effective amounts of ultraviolet light, (preferably at wavelengths of less than about 3000 A), thereby forming a visually discernable image.

The physical nature of the image within the film will vary with the relative concentration of degradable polymer and acid generating polymer; the duration of exposure of the film to activating electromagnetic radiation; the intensity and wavelength of the ultraviolet light source; film thickness; the physical properties of the nonessential components (e.g. thermoplastic resin); and the lapsed time between initial imaging and subsequent thermal and/or chemical intensification of the image pattern.

Figure 2:
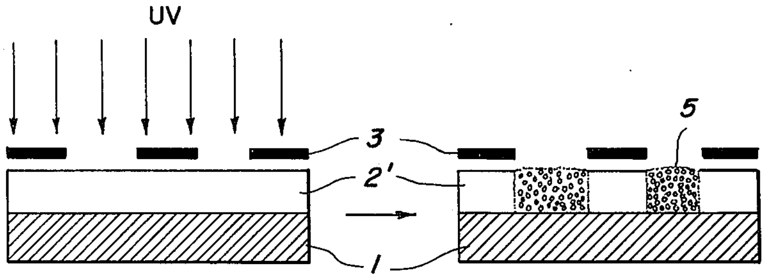
FIG. 2 is an elevational view in vertical cross-section through an imaging member wherein microbubbles are formed within the illuminated areas of its imaging layer subsequent to irradiation of said layer with ultraviolet light.
Figure 3:
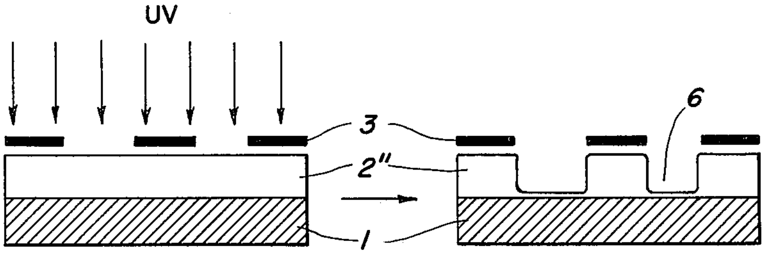
FIG. 3 is an elevational view in verticle cross-section through an imaging member wherein the exposed areas of its imaging layer are rendered almost totally devoid of polymeric material subsequent to irradiation with ultraviolet light.

In FIGS. 1 – 3 are shown different forms the image can take upon variation of one or more of the above factors. For example, where there is a predominant amount (generally in excess of about 50% by weight of acid degradable polymer in the imaged regions of the film), degradation of such regions can produce a imaging member wherein such imaged areas are substantially devoid of polymeric material (FIG. 3). On the other hand, in the event that only moderate amounts (generally from about 25 to about 40% by weight) of acid degradable polymer are present in the regions of the film subjected to activating electromagnetic radiation, the degradation of the polymer will only result in plasticizing of these exposed regions (FIG. 1). Where only very small amounts (generally less than about 10% by weight) of acid degradable polymer are present in the film, its degradation upon irradiation may go undetected until the imaged areas of the film are thermally developed. Heating such films will result in an expansion of the gaseous products of polymer degradation, thus, forming a vesicular image of the type shown in FIG. 2. Prolonged delay between imaging and thermal development should be avoided since the gaseous degradation products can diffuse from the composition and, thus, subsequent thermal treatment may not produce the desired vesicular image.

Additional embodiments of this invention can involve the development of color within the irradiated areas of such films. Typical of such an embodiment would involve the formulation of an imaging layer as hereinbefore described; except that beta napthol would be dispersed throughout the matrix of such a film, and a dye coupling agent, such as a diazonium salt, encapsulated by the degradable polymer. Upon photoinduced dehydrohalogenation of the acid generating polymer, an acid forms which initiates degradation of the polymer capsule. The release of the diazonium salt from the capsule into the bulk of the film permits it to couple with beta naphthol thereby producing an image of high optical density.

The image generated as a result of the selective depolymerization of the acid degradable polymer can also be intensified by, for example, reaction of the mineral acids contained within these images areas with other materials thereby forming an intensely colored dye or by reaction of certain materials within the unsaturated polymers contained within these same imaged areas.

The Examples which follow further define, describe and illustrate the adaptation of the aforedescribed acid catalyzed depolymerization to the preparation of permanent visible images. The techniques and equipment set forth in the Examples relating to preparation and use of these selectively degradable polymeric compositions are standard or as hereinbefore described. Parts and percentages appearing in such Examples are by weight unless otherwise indicated.

EXAMPLES

A series of thin films are prepared by dissolving the degradable polymer, the acid generating polymer and the electron acceptor in the proper proportions in tetrahydrofuran (THF) and then casting the resulting solution on a suitable substrate (e.g. glass, aluminum, Mylar etc.). The dry film thickness of such layers is allowed to vary within the previously defined limits. Each of the films thus prepared is dried prior to use. Where the degradable polymer is inherently unstable at elevated temperature drying is carried out at room temperature and under a vacuum. Each of the films is selectively irradiated with ultraviolet light (UV SL — 25, 10 Watt output, Ultraviolet Products, San Gabriel, Calif. through a quartz glass transparency from a distance of one foot for a period of 60 seconds. The text which follows provides the recipes of such a series of films and the effects of irradiation on the exposed areas of such films.

EXAMPLE I

A. Acid degradable polymeric composition — 90 parts by weight poly(acetaldehyde)-(acid degradable polymer); 10 parts by weight poly(vinylchloride)-(acid generating polymer); and 0.1 part by weight tetracyanoethylene-(organic electron acceptor).

B. Film Thickness — 40 microns

C. Effects of imagewise irradiation with ultraviolet light — After selective exposure of film 2″ prepared from the above composition, depressions 6 occur within those regions which are subjected to such irradiation (as shown in FIG. 3).

EXAMPLE II

The procedures of Example I are repeated except for the substitution of poly(vinylbromide) for poly(vinylchloride).

EXAMPLE III

The procedures of Example I are repeated except for the substitution of poly(vinyliodide) for poly(vinylchloride).

EXAMPLE IV

The procedures of Example I are repeated except for the substitution of poly(vinylidenechloride) for poly(-vinylchloride)

EXAMPLE V

The procedures of Example I are repeated except for the substitution of poly(vinylidenebromide) for poly(-vinylchloride).

EXAMPLE VI

The procedures of Example I are repeated except for the substitution of poly(vinylideneiodide) for poly(-vinylchloride).

EXAMPLE VII

The procedures of Example I are repeated except for a shift in the relative concentration of acid degradable polymer to acid generating polymer from 90:10 to 50:50; and the concentration of Lewis Acid adjusted accordingly. The effects of such a shift are manifest in the type of image produced. Whereas, in Example I the exposure of the film prepared therein results in the formation of depressions in the irradiated areas, similar exposure of film 2 prepared from the composition of this Example only results in plasticizing of these same regions 4 thus making them soft and tacky (as shown in FIG. 1).

EXAMPLE VIII

The procedures of Example VII are repeated except for the substitution of poly(vinylbromide) for poly(-vinylchloride).

EXAMPLE IX

The procedures of Example VII are repeated except for the substitution of poly(vinyliodide) for poly(vinylchloride).

EXAMPLE X

The procedures of Example VII are repeated except for the substitution of poly(vinylidenechloride) for poly(vinylchloride).

EXAMPLE XI

The procedures of Example VII are repeated except for the substitution of poly(vinylidenebromide) for poly(vinylchloride).

EXAMPLE XII

The procedures of Example VII are repeated except for the substitution of poly(vinylideneiodide) for poly(-vinylchloride).

EXAMPLE XIII

The procedures of Example I are repeated except for a shift in the relative concentration of acid degradable polymer to acid generating polymer from 90:10 to 10:90; and the concentration of Lewis Acid adjusted accordingly. The effects of such a shift are manifest in a type of image produced. Whereas, in Example I the exposure of the film prepared therein results in the formation of depressions in the irradiated areas, similar exposure of film 2' prepared from the composition of this Example does not result in any appreciable change in the film physical properties. Shortly after imaging, the imaging layer of this Example is gently heated with a hot air gun until bubbles begin to appear within irradiated regions 5 of the film thus forming a vesicular image (as shown in FIG. 2).

EXAMPLE XIV

The procedures of Example XIII are repeated except for the substitution of poly(vinylbromide) and poly(-vinylchloride).

EXAMPLE XV

The procedures of Example XIII are repeated except for the substitution of poly(vinyliodide) for poly(vinylchloride).

EXAMPLE XVI

The procedures of Example XIII are repeated except for the substitution of poly(vinylidenechloride) for poly(vinylchloride).

EXAMPLE XVII

The procedures of Example XIII are repeated except for the substitution of poly(vinylidenebromide) for poly(vinylchloride).

EXAMPLE XVIII

The procedures of Example XIII are repeated except for the substitution of poly(vinylideneiodide) for poly(-vinylchloride).

What is claimed is:

1. A composition comprising:

i. at least one acid degradable polymer of the formula

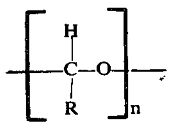

wherein

R is an aliphatic hydrocarbon radical of 1 – 6 carbon atoms, a chlorinated aliphatic hydrocarbon radical of 1 – 6 carbon atoms, or a nitrile substituted aliphatic hydrocarbon radical of 1 – 5 carbon atoms; and

*n* is at least 50 ii. at least one acid generating polymer of the formula

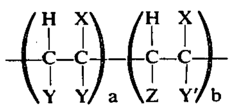

wherein

X is selected from among chlorine, bromine or iodine

Y and Y' are independently selected from X or hydrogen; and

Z is selected from among Y, alkyl of about 1 to 8 carbon atoms, phenyl or alkyl substituted phenyl, said alkyl substituent having from about 1 to 8 carbon atoms

*a* and *b* represent the mole percent of each of the components within the acid generating polymer and have an aggregate value equal to 100% and iii. an organic electron acceptor;

the weight ratio of acid degradable polymer to acid generating polymer ranging from about 99:1 to about 1:99 and the concentration of electronic acceptor ranging from about 0.1 to about 5 weight percent based upon the concentration of acid generating polymer.

2. The composition of claim 1, wherein the acid degradable polymer is poly(acetaldehyde).

3. The composition of claim 1, wherein the acid generating polymer is poly(vinylchloride).

4. The composition of claim 1, wherein the acid generating polymer is poly(vinylbromide).

5. The composition of claim 1, wherein the acid generating polymer is poly(vinyliodide).

6. The composition of claim 1, wherein the acid generating polymer is poly(vinylidenechloride).

7. The composition of claim 1, wherein the acid generating polymer is poly(vinylidenebromide).

8. The composition of claim 1, wherein the acid generating polymer is poly(vinylideneiodide).

9. The composition of claim 1, wherein the organic electronic acceptor is tetracyanoethylene.

10. The composition of claim 1, wherein the organic electronic acceptor is chloranil.

11. The composition of claim 1, wherein the organic electronic acceptor is cyananil.

12. The composition of claim 1, wherein the organic electronic acceptor is dichlorodicyanobenzoquonone.

13. The composition of claim 1, wherein the organic electronic acceptor ir tetracyanoquonodimethan.

14. The composition of claim 1, wherein the organic electronic acceptor is 2,4,7-trinitro-9-fluorenone.

15. An imaging method based upon selective ultraviolet light induced acid catalyzed degradation of an imaging layer comprising:

i. at least one acid degradable polymer of the formula

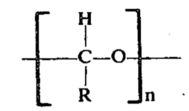

wherein

R is an aliphatic hydrocarbon radical of 1 – 6 carbon atoms, a chlorinated aliphatic hydrocarbon radical of 1 – 6 carbon atoms, or a nitrile substituted aliphatic hydrocarbon radical of 1 – 5 carbon atoms; and

*n* is at least 50 ii. at least one acid generating polymer of the formula

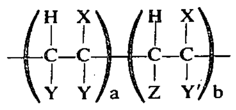

wherein

X is selected from among chlorine, bromide or iodine

Y and Y′ are independently selected from X or hydrogen; and

Z is selected from among Y, alkyl of about 1 – 8 carbon atoms, phenyl or alkyl substituted phenyl, said alkyl substituent having from about 1 – 8 carbon atoms

*a* and *b* represent the mole percent of each of the components within the acid generating polymer and have an aggregate value equal to 100%; and iii. an organic electron acceptor;

the weight ratio of acid degradable polymer to acid generating polymer ranging from about 99:1 to about 1:99 and the concentration of electronic acceptor ranging from about 0.1 to about 5 weight percent based upon the concentration of acid generating polymer, said method comprising:

exposing said imaging layer to an image pattern of ultraviolet light for an interval sufficient to induce dehydrohalogenation of at least some of the acid degradable polymer and thus catalyze acid degradation of the degradable polymer.

16. The method of claim 15, wherein the acid degradable polymer is poly(acetaldehyde).

17. The method of claim 15, wherein the acid generating polymer is poly(vinychloride).

18. The method of claim 15, wherein the acid generating polymer is poly(vinylbromide).

19. The method of claim 15, wherein the acid generating polymer is poly(vinyliodide).

20. The method of claim 15, wherein the acid generating polymer is poly(vinylidenechloride).

21. An imaging member comprising an imaging layer having a thickness in the range of from about 0.1 to about 300 microns which contains i. at least one acid degradable polymer of the formula

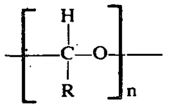

wherein

R is an aliphatic hydrocarbon radical of 1 – 6 carbon atoms, a chlorinated aliphatic hydrocarbon radical of 1 – 6 carbon atoms, or a nitrile substituted aliphatic hydrocarbon radical of 1 – 5 carbon atoms; and

*n* is at least 50 ii. at least one acid generating polymer of the formula

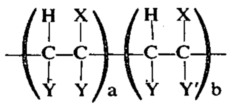

wherein

X is selected from among chlorine, bromine or iodine

Y and Y′ are independently selected from X or hydrogen; and

Z is selected from among Y, alkyl of about 1 – 8 carbon atoms, phenyl or alkyl substituted phenyl, said alkyl substituents having from about 1 to 8 earbon atoms

*a* and *b* represent the mole percent of each of the components within the acid generating polymer and have an aggregate value equal to 100 percent; and iii. an organic electron acceptor.

22. The imaging member of claim 21, wherein the degradable polymer is poly(acetaldehyde).

23. The imaging member of claim 21, wherein the acid generating polymer is poly(vinylbromide).

24. The imaging member of claim 21, wherein the relative concentration of acid degradable polymer to acid generating polymer is in the range of from about 99:1 to about 1:99.

25. The imaging member of claim 21 wherein the imaging layer has been selectively exposed to ultraviolet light whereby said imaging layer is selectively degraded in conformity with said selective exposure.

26. The imaging member of claim 25 wherein said selective exposure results in the formation of raised and depressed regions within the imaging layer.

27. The imaging member of claim 25 wherein the selective exposure results in the formation of tacky and nontacky regions on the surface of the imaging layer.

28. The imaging member of claim 25 wherein the selective exposure results in the formation of diffuse and specular regions on the surface of the imaging layer.

* * * * *